United States Patent [19]

Ripka

[11] Patent Number: 4,993,402
[45] Date of Patent: Feb. 19, 1991

[54] FUEL EFFICIENT RAPID RESPONSE WATER HEATING MODULE

[75] Inventor: Chester D. Ripka, East Syracuse, N.Y.

[73] Assignee: Carrier Corporation, Syracuse, N.Y.

[21] Appl. No.: 451,654

[22] Filed: Dec. 18, 1989

[51] Int. Cl.⁵ .............................................. F24H 1/00
[52] U.S. Cl. ................. 126/361; 126/350 R; 126/391
[58] Field of Search .............. 126/361, 350 R, 391, 126/392, 373; 220/444, 445, 429

[56] References Cited

U.S. PATENT DOCUMENTS

| | | | |
|---|---|---|---|
| 4,465,025 | 8/1984 | Schröder | 126/361 X |
| 4,541,410 | 9/1985 | Jatana | 126/361 X |
| 4,641,631 | 2/1987 | Jatana | 126/101 |
| 4,702,226 | 10/1987 | Shelley | 126/362 |
| 4,766,883 | 8/1988 | Cameron et al. | 126/361 X |
| 4,782,815 | 11/1988 | Friedman | 126/361 |
| 4,823,770 | 4/1989 | Loeffler | 126/362 |

Primary Examiner—Larry Jones
Attorney, Agent, or Firm—Charles E. Adams

[57] ABSTRACT

A water heating module. The module is adapted for heating water for general residential and commercial use and as a supply for a hydronic heating system. The module is capable of supplying a large volume of hot water near instantaneously on demand without exhaustion. There is a small hot water tank in the module, to supply small demands and to reduce ambient losses while module is in standby. Condensing combustion gases are used to preheat incoming cold water; both features combining to produce high fuel efficiency in the module. A radiant infrared burner may be used in the module to eliminate combustion roar and also to substantially reduce $NO_x$ emission, thus enabling sale of the module in jurisdictions having strict $NO_x$ emission standards.

16 Claims, 1 Drawing Sheet

U.S. Patent
Feb. 19, 1991
Sheet 1 of 1
4,993,402
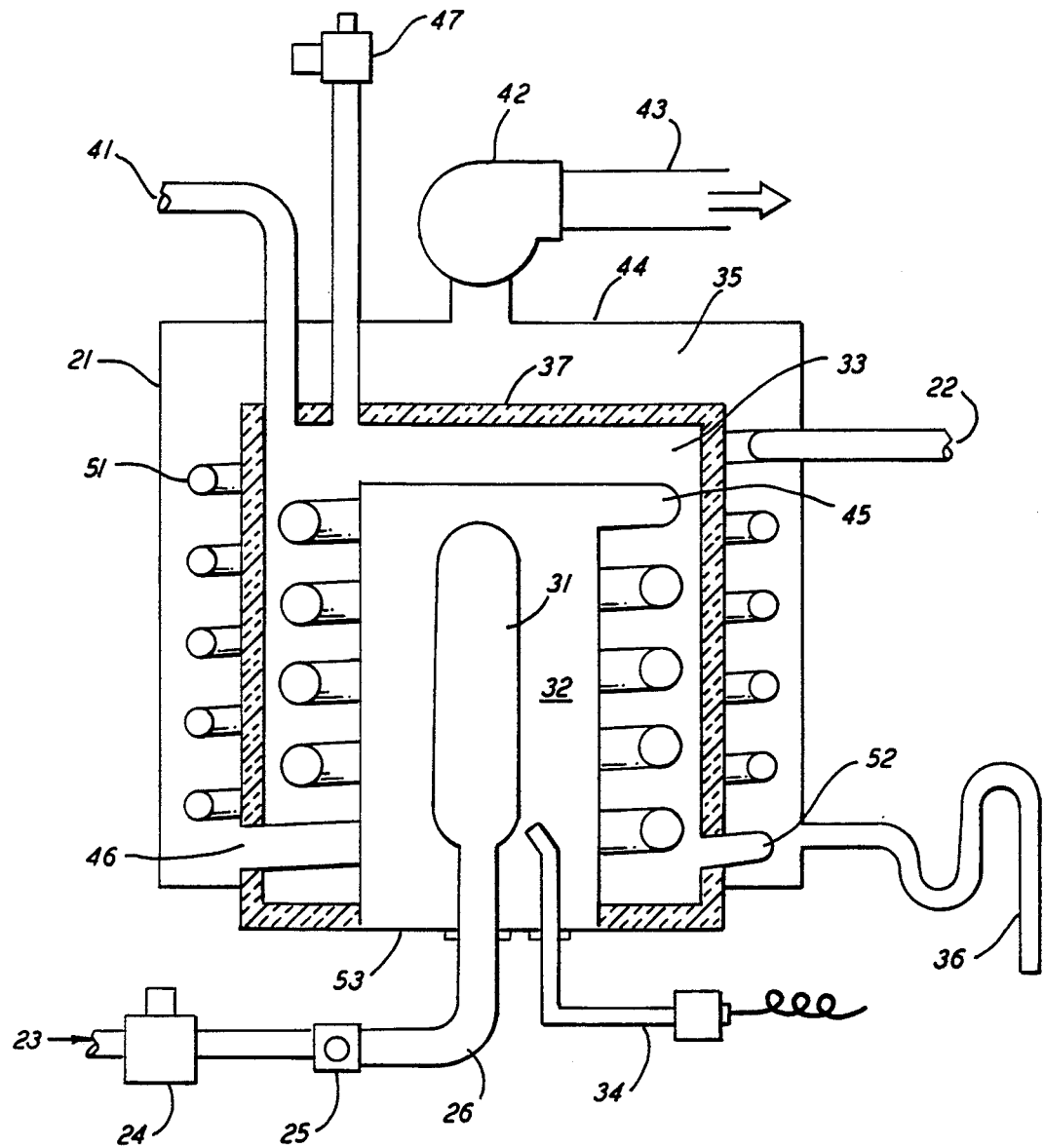

FUEL EFFICIENT RAPID RESPONSE WATER HEATING MODULE

BACKGROUND OF THE INVENTION

1. Field of the invention

This invention relates generally to devices for the heating of water for general service water applications and for use in a hydronic space heating system. In particular, the invention relates to a module for rapidly heating water for service hot water and space heating with high thermal efficiency.

2. Description of the Prior Art

Space heating systems for residences and other building all operate on the same general principle. The air in the space to be heated circulates in a closed loop system. Part of the loop includes a heat exchanger, either one in direct contact with a burning fuel or one in contact with a heat transfer fluid, such as water, which has been heated by a burning fuel.

One type of space heating system, a direct forced air system, uses a furnace containing a combustion chamber in which fuel is burned creating combustion gases which then pass through the interior of a heat exchanger. Air from the space to be heated passes around the exterior of the heat exchanger absorbing heat by means of conduction and convection before being returned to the heated space.

Another type of heating system, a hydronic system, uses a furnace containing a combustion chamber and a heat exchanger for transferring the heat of combustion to a heat transfer liquid, usually water, which is then circulated through a closed loop system to a second heat exchanger where the heat in the loop is transferred to the air in the space to be heated. This second heat exchanger may be either a radiator, located in the space, over which the air to be heated passes by natural convective flow or a heating coil located in an air box having a fan to circulate air from the space to be heated over the coil and back to the space.

Conventional heating systems of both the direct forced air and hydronic types are relatively inefficient, as the combustion gases exit the furnace heat exchanger and are exhausted to the exterior of the building via a flue or chimney while still at a relatively high temperature. Much of the heat energy contained in the input fuel is therefore lost "up the flue" and is not available to heat spaces within the building. Conventional systems suffer from "up the flue" losses even when they are not producing heat by combustion. Warmed air from the heated space rises and is exhausted to the atmosphere via the flue and stack. In a conventional hydronic system, the off cycle loss is exacerbated because the hot water in the tank surrounding the flue heats the air in the flue, increasing the rate of space air loss and reducing tank water temperature.

In a conventional hydronic system, the water heating volume in the furnace is relatively small, resulting in a relatively small heat storage capability. The burner and heat exchanger in such a system must therefore be relatively large in order to meet the nearly instantaneous demand when temperature control devices in the spaces to be heated call for heat. This in turn requires a relatively large furnace enclosure to house the burners in such a system.

In conventional hot water heaters, a burner of relatively small capacity is used to heat a relatively large volume of water. The burner in such a heater is not able to heat the water rapidly enough to meet an instantaneous demand for hot water. Instead, such demands are met by drawing upon the relatively large reservoir of hot water maintained in the heater. High hot water demands may, however, deplete the reservoir. The efficiency of conventional hot water heaters is relatively low not only because of "up the flue" losses described in the discussion of space heating systems above, but also the ambient heat losses from the large reservoir of hot water maintained in such systems.

In recent years, the industry has developed and introduced improved high efficiency condensing furnaces. In such furnaces, "up the flue" heat losses are reduced by using the hot combustion exhaust gases to preheat the circulating ambient air before it enters the main heat exchanger. The preheating process reduces the temperature of the exhaust gases, some to their dewpoint and lower, and those gases condense. Some such furnaces have automatic flue dampers or other flow restricting devices that prevent or reduce the flow of warmed space air "up the flue" when the furnace is not operating.

Most residential and commercial building require both space heating and hot water. Such buildings now generally satisfy these requirements with separate space heating furnaces and hot water heaters. Not only does such an arrangement require a relatively large amount of space, it requires the provision of separate gas or fuel lines, separate ignition and control devices and, in many cases, separate or more complex exhaust gas flue systems to serve the separate heating devices, resulting in increased material and installation costs.

When in operation, burners used in conventional heating systems typically produce low frequency noise, known as "combustion roar". If the furnace is connected to a system of ducting, the ducts can amplify and transmit the sound generated in the furnace to spaces being heated.

The combustion gases generated by the burners normally used in conventional heating and hot water systems contain oxides of nitrogen, collectively termed $NO_x$, which, together with other combustion gases, go "up the flue" to be vented to the atmosphere. Limiting the concentration of $NO_x$ in the flue gases is desirable, as heating devices sold in certain jurisdictions must comply with very low $NO_x$ emission requirements.

The radiant infrared type of burner overcomes the drawbacks of conventional burners as it burns silently and with substantially reduced concentrations of $NO_x$ in its combustion gases.

The industry has also developed heat exchangers of improved and more compact design, allowing them to be enclosed in smaller furnace enclosures.

SUMMARY OF THE INVENTION

An object of the invention is to combine into a single compact unit a means to supply hot water for any purpose, particularly for a hydronic space heating system and for domestic, commercial and other service hot water requirements.

A further object of the invention is to attain the capability, in a compact module operating at a high fuel efficiency, to supply a large volume of hot water near instantaneously on demand without exhaustion.

A still further object of the invention is to employ in a water heating module a burner that operates quietly and produces very low concentrations of nitrogen oxides ($NO_x$) in its exhaust gases.

These and other objects of the invention are attained by providing a hot water heating module having a small water heating and reserve tank. A burner is disposed within a cavity in the tank to heat water in the tank. The burner is of sufficient capacity for near instantaneous heating of water on demand. The tank is sized so as to satisfy small intermittent demands, without requiring the burner to cycle on and off and to minimize ambient heat losses from the tank during periods of no or low demand. A preheater jacket surrounds the outside of the tank. There is a layer of insulation between the tank and the jacket to limit conductive heat flow from the tank to the jacket. A flue is disposed within the tank and connects the burner cavity to the jacket to provide a flow path for combustion gases from the burner through the cavity, tank flue and jacket to the exterior of the module and to transfer heat from the combustion gases to water in the tank. A means, such as a fan, is provided to induce a draft through this flow path. Cold water supplied to the module first passes through a heat exchanger in the jacket where it both condenses the combustion gases and is itself preheated. There is a means to drain condensate from the jacket. The preheated water then flows from the jacket into the water tank where it is heated by heat transfer from the hot combustion gases flowing through the tank flue and from the burner through the common wall between the burner cavity and the tank. In a preferred embodiment of the invention, the burner is of the radiant infrared type. In the preferred embodiments, the jacket and the tank flue are either fabricated from a corrosion resistant metal or have a corrosion resistant coating on those surfaces which are in contact with combustion gases, the tank flue is helically disposed within the water tank and the means for heat exchange between the cold water and combustion gas in the preheater jacket is a tube helically disposed within the jacket.

Although preferred embodiments of the present invention have been illustrated and described, other embodiments may occur to those skilled in the art. It is therefore intended that the present invention be limited only by the scope of the below claims.

BRIEF DESCRIPTION OF THE DRAWING

The accompanying FIG. 1, which forms a part of the specification, is a sectioned elevation view of the heating module.

DESCRIPTION OF THE PREFERRED EMBODIMENTS

It should be noted that the drawing and specification show and describe the use of a gaseous fuel such as natural gas or liquified petroleum gas. As one skilled in the art is aware, conventional flame as well as radiant infrared burners can also operate satisfactorily when burning a mixture of combustion air and a vaporized liquid fuel such as fuel oil or kerosene. It is intended therefore that the scope of the invention includes the use of any suitable type of burner employed in a hot water heating module as disclosed with any suitable type of fuel supply, including means to vaporize liquid fuel before mixing it with combustion air when necessary and appropriate.

Referring to the drawing, FIG. 1 is a sectional elevation view of a hot water heating module 21 for heating hot water. The module is adaptable to supply hot water for general residential and commercial uses, for a hydronic heating system or for other uses. Module 21 takes cold water to be heated through cold water inlet 22. The water supply may be cold potable water from a house potable water line, the cool water return line from a space heating system or from both. Water flow into and through module 21 may be the result of line pressure in the potable water supply system, a pump in a space heating circulating water system (not shown) or both. Water is heated in module 21 and then is available, on demand, through hot water outlet 41 for general hot water service or to supply heated water to a heating system. Module 21 receives fuel gas from fuel gas supply line 23 having regulator 24. Ambient air is drawn into and mixes with the fuel gas through air inlet port 25 in fuel/air feed pipe 26. The fuel and air mixture enters module 21 where it is burned in burner 31, described below. The main component of heating module 21 is cylindrical water heating and reserve tank 33. Located within the tank is burner cavity 32, within which is coaxially mounted burner 31. The burner may be of any type. In a preferred embodiment of the invention, the burner is of the radiant infrared type. In that embodiment, outer end 53 of burner cavity 32 is closed to the passage of air so that the only air supplied to burner 31 is via fuel/air feed pipe 26 and no secondary combustion occurs in the burner cavity. Tank 33 is constructed so that water cannot pass from the tank into burner cavity 32. Pressure relief valve 47 protects tank 33 from overpressure. Tank flue 45, generally circular in cross section, is helically and coaxially disposed within tank 33. The tank flue serves as a passage for combustion gases produced by burner 31 from burner cavity 32 via cavity-to-flue outlet 46 to preheater jacket 35. Water in tank 33 is heated by heat transfer through the common wall between the tank and burner cavity 32, which in turn is heated by burner 31 and the hot combustion gases in the burner cavity. In addition, as hot combustion gases pass through tank flue 45, heat is transferred to water in the tank by conduction through the walls of the flue. Under normal operating conditions, none of the combustion gases should condense in the tank flue. Some condensation, however, may occur within the tank flue during start up of the module when the tank is full of cold water. The configuration of tank flue 44 and flue-to-jacket outlet 46 is such that any condensation formed in the tank flue will drain into preheater jacket 35. Any condensation formed in burner cavity 32 will evaporate upon ignition of burner 31 at startup. Jacket 35 surrounds tank 33. Insulation 37 between tank 33 and jacket 35 limits conductive heat flow from the tank to the jacket. Within the jacket is coaxially and helically disposed preheater/condenser coil 51. Water passes through coil 51 from cold water inlet 22 to tank preheated water inlet 52. As the water passes through the coil, it is preheated by and condenses combustion gases in jacket 35. Condensate drain 36 removes the liquid condensate from the jacket. Induction draft unit 42, such as a fan, draws on jacket 35, causing a flow of combustion gases from burner cavity 32, through tank flue 45, the preheater jacket 35 and out of module 21 to external flue 43. If a radiant infrared burner is used, the induction draft unit also creates the differential pressure between the interior and exterior of the burner required to cause the fuel and air mixture to pass through the gas permeable walls of the burner. Flow of the fuel and air mixture into and through the burner, as well as combustion gas flow from the burner cavity to the external flue may also be effected by use of a blower upstream in the module air/fuel flow path. Ignition device 34, which initially lights the mixture of gas and air on startup of the module, is a conventional furnace control not discussed in detail here. In such a control, a spark igniter or hot surface igniter system ignites the air fuel mixture on the burner surface and a flame detector senses whether combustion actually occurs. Since the condensed combustion gases can be corrosive to many materials, surfaces of the module which come in contact with the condensate, such as tank flue 45, preheater jacket 35 and preheater/condenser coil 51 may be protected with a corrosion resistant coating or the components themselves may be fabricated of a corrosion resistant material, such as stainless steel or, in the case of the coil, an appropriate plastic material.

What is claimed is:

1. A fuel efficient rapid response water heating module comprising:
   a water heating tank;
   a burner cavity disposed within said water heating tank;
   a burner disposed within said burner cavity;
   means for supplying a mixture of fuel and air to said burner;
   preheater jacket means, surrounding said water heating tank;
   flue means disposed within said water heating tank forming a path for the transfer of combustion gases from said burner cavity to said preheater jacket means;
   means for supplying cold water to said module;
   outlet means for providing service hot water from said module;
   preheater means disposed within said preheater jacket means both to preheat water coming into said module from said cold water supply means and to condense combustion gases within said jacket means;
   means for transferring preheated water from said preheater jacket means to said water heating tank;
   means, in flow communication with said preheater jacket means, for draining condensate from said preheater jacket means; and
   means for causing a flow of said fuel and air mixture to said burner and for causing a flow of combustion gases from said burner cavity, through said flue means and through said preheater jacket means to the atmosphere.

2. The heating module of claim 1 in which said burner is a radiant infrared burner.

3. The heating module of claim 2 in which said radiant infrared burner is gas fired.

4. The heating module of claim 1 in which said flow generating means is an induction fan drawing on said preheater jacket means.

5. The heating module of claim 1 in which said water heating tank is cylindrical.

6. The heating module of claim 5 in which said burner cavity is cylindrical and coaxially disposed within said water heating tank and said burner is coaxially disposed within said burner cavity.

7. The heating module of claim 6 in which said preheater jacket means and said flue means are corrosion resistant.

8. The heating module of claim 7 in which said preheater jacket means and said flue means are fabricated of a corrosion resistant material.

9. The heating module of claim 7 in which surfaces of said preheater jacket means and said flue means that may come in contact with combustion gases are coated with a corrosion resistant material.

10. The heating module of claim 5 in which said flue means is helically and coaxially disposed about said burner cavity within said water heating tank.

11. The heating module of claim 10 in which said flue means is generally circular in cross section.

12. The heating module of claim 11 in which said preheater means is a helically coiled tube coaxially disposed within said preheater jacket.

13. The heating module of claim 12 in which said helically coiled tube is fabricated of a corrosion resistant material.

14. The heating module of claim 5 in which said preheater jacket means is cylindrical and coaxially disposed about said water heating tank.

15. The heating module of claim 1 in which said helically coiled tube is fabricated of a plastic material.

16. The heating module of claim 1 in which said preheater jacket means is thermally insulated from said water heating tank.

* * * * *